United States Patent [19]

Elanchenny et al.

[11] 4,401,552
[45] Aug. 30, 1983

[54] BENEFICIATION OF FROTH OBTAINED FROM TAR SANDS SLUDGE

[75] Inventors: Vythilingam Elanchenny, East Bradford; Walter H. Seitzer, West Chester, both of Pa.

[73] Assignee: Suncor, Inc., Toronto, Canada

[21] Appl. No.: 253,473

[22] Filed: Apr. 13, 1981

[51] Int. Cl.³ .............................................. C10G 1/04
[52] U.S. Cl. .............................................. 208/11 LE
[58] Field of Search ................ 208/11 LE, 188, 8 LE

[56] References Cited

U.S. PATENT DOCUMENTS

| | | | |
|---|---|---|---|
| 3,330,757 | 7/1967 | Bichard | 208/188 |
| 3,331,765 | 7/1967 | Canevari et al. | 208/188 |
| 4,018,664 | 4/1977 | Bain et al. | 208/11 LE |

*Primary Examiner*—Delbert E. Gantz
*Assistant Examiner*—A. Pal
*Attorney, Agent, or Firm*—J. E. Hess; Donald R. Johnson; Patrick G. Baker

[57] ABSTRACT

An improvement in the treatment of sludge recovered from a pond containing tailings from a water extraction process of tar sands characterized in that the froth produced from a treatment of the sludge is diluted with water which is at an ambient temperature, and the diluted froth is agitated and aerated vigorously for a short time to obtain an upper froth layer which contains most of the bitumen and substantially reduced amounts of mineral and water. The upper froth layer is obtained by, e.g., skimming it from the froth produced by the agitation and aeration.

4 Claims, 1 Drawing Figure

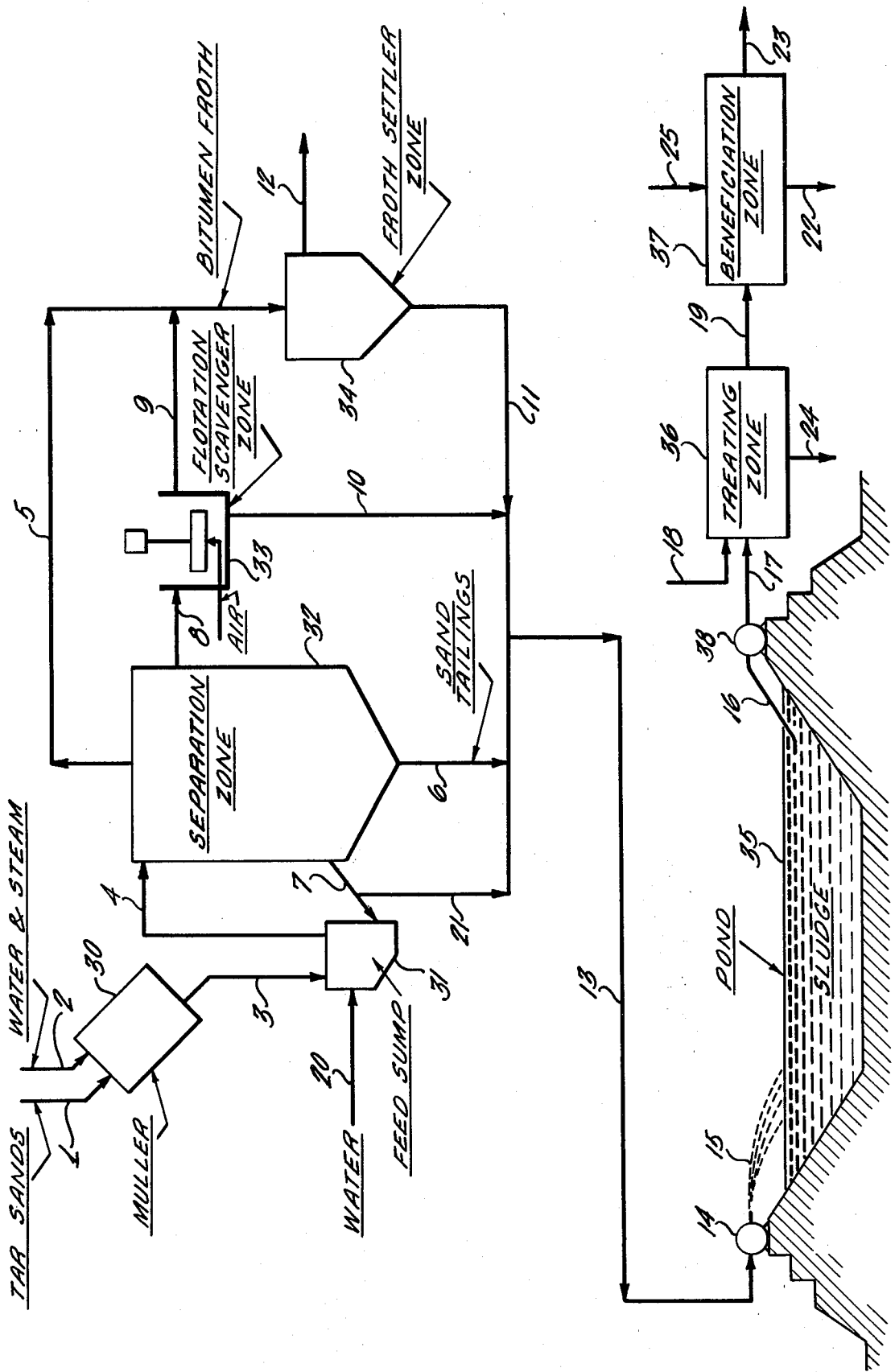

BENEFICIATION OF FROTH OBTAINED FROM TAR SANDS SLUDGE

BACKGROUND OF THE INVENTION

The present invention relates generally to an improvement in the recovery of bitumen from tar sands. The invention further relates to an improvement in the recovery of bitumen in aqueous processes for extracting bitumen from tar sands. Generally the invention involves the beneficiation of froth obtaind from tar sands sludge. The invention particularly relates to the improved treatment of froth produced during the treatment of sludge obtained from a retention pond used to store tailings obtained from water extraction of bitumen from tar sands. The invention involves the beneficiation of sludge forth by dilution with water and subjecting the resulting mixture to concurrent agitation and aeration.

Tar sands are also known as oil sands or bituminous sands. The sand deposits are found in numerous locations throughout the world, e.g., Canada, United States, Venezuela, Albania, Rumania, Malagasy and U.S.S.R. The largest deposit, and the only one of present commercial importance is in the northeast of the Province of Alberta, Canada.

Tar sand is a three-component mixture of bitumen, mineral and water. Bitumen is the component for the extraction of which tar sands are mined and processed. The bitumen content is variable, averaging 12 wt.% of the deposit, but ranging from about 0 to 18 wt.%, and as used herein bitumen includes hydrocarbons. Water typically runs 3 to 6 wt.% of the mixture, increasing as bitumen content decreases. The mineral content constitutes the balance.

Several basic extraction methods have been known for many years for separating the bitumen from the sands. In the "cold-water" method, the separation is accomplished by mixing the sands with a solvent capable of dissolving the bitumen. The resulting mixture is then introduced into a large volume of water, water with a surface active agent added, or a solution of neutral salt in water. The combined mass is then subjected to a pressure or gravity separation.

The "hot-water" process for primary extraction of bitumen from tar sands consists of three major process steps (a fourth step, final extraction, is used to clean up the recovered bitumen for further processing). In the first step, called conditioning, tar sand is mixed with water and heated with open steam to form a pulp of 70-85 wt.% solids. Sodium hydroxide or other reagents are added as required to maintain the pH in the range of about 8.0-8.5. In the second step, called separation, the conditioned pulp is diluted further so that settling can take place. The bulk of the sand-sized particles (greater than 325 mesh screen) rapidly settles and is withdrawn as sand tailings. Most of the bitumen rapidly floats (settles upward) to form a coherent mass known as bitumen froth which is recovered by skimming the settling vessel. An aqueous middlings layer containing some mineral and bitumen is formed between these layers. A scavenger step may be conducted in the middlings layer from the primary separation step to recover additional amounts of bitumen therefrom. This step usually comprises aerating the middlings. The froths recovered from the primary and scavenger step can be combined, diluted with naphtha and centrifuged to remove more water and residual mineral. The naphtha is then distilled off and the bitumen is coked to a high quality crude suitable for further processing. Hot water processes are described in the prior art. Tailings can be collected from the aforementioned processing steps and generally will contain solids as well as dissolved chemicals. The tailings are collected in a retention pond in which additional separation occurs. The tailings can also be considered as processing water containing solids which are discharged from the extraction process. The tailings comprise water, both the natural occurring water and added water, bitumen and mineral.

The mineral particle size distribution is particularly significant to operation of the hot water process and to sludge accumulation. The terms "sand," "silt" and "clay" are used in this specification as particle size designations. Sand is siliceous material which will not pass through a 325 mesh screen. Silt will pass through a 325 mesh screen, but is larger than two microns and can contain siliceous material. Clay is smaller than 2 microns and also can contain siliceous material. The term "fines" as used herein refers to a combination of silt and clay.

Conditioning tar sands for the recovery of bitumen comprises the heating of the tar sand/water feed mixture to process temperature (180°-200° F.), physical mixing of the pulp to uniform composition and consistency, and the consumption (by chemical reaction) of the caustic or other added reagents. Among the added reagents disclosed in the prior art are phosphates, sodium hydroxide and sodium tripolyphosphate, alkali metal bicarbonates, and the product resulting from the addition of ammonium hydroxide to aqueous tannic acid. Also non-foaming wetting agents including non-ionic detergents are often added. Under these conditions, bitumen is stripped from the individual sand grains and mixed into the pulp in the form of discrete droplets of a particle size on the same order as that of the sand grains. The same process conditions, it turns out, are also ideal for accomplishing deflocculation of the clays which occur naturally in the sand feed. Deflocculation, or dispersion, means breaking down the naturally occurring aggregates of clay particles to produce a slurry of individual particles. Thus during conditioning, a large fraction of the clay particles becomes well dispersed and mixed throughout the pulp. The conditioning process which prepares bitumen for efficient recovery during the following process steps also causes the clays to be the most difficult to deal with in the tailings operation.

The conditioned tar sand pulp is screened to remove rocks and unconditionable lumps of tar sands and clay. The reject material "screen oversize," is discarded. The next process step, called "separation," is the bitumen recovery step. The screened pulp is further diluted with water to promote two settling processes. Globules of bitumen, essentially mineral-free, float upward to form a coherent mass of froth on the surface of the separation units; at the same time, mineral particles, particularly the sand size material, settle down and are removed from the bottom of the separation unit as sand tailings. These two settling processes take place through a medium called the middlings. The middlings consists primarily of water, bitumen particles and suspended fines.

The particular sizes and densities of the sand and of the bitumen particles are relatively fixed. The parameter which influences the settling processes most is the viscosity of the middlings. Characteristically, as the suspended material content rises above a certain threshold, which varies according to the composition of the suspended fines, viscosity rapidly achieves high values with the effect that the settling processes essentially stop. Little or no bitumen is recovered and all streams exiting the unit have about the same composition as the feed. As the feed suspended fines content increases, more water must be used in the process to maintain middlings viscosity within the operable range.

The third step of the hot water process is scavenging. The feed suspended fines content sets the process water requirement through the need to control middlings viscosity which, as noted before, is governed by the clay/water ratio. It is usually necessary to withdraw a drag stream of middlings to maintain the separation unit material balance, and this stream of middlings can be scavenged for recovery of incremental amounts of bitumen. Air flotation is an effective scavenging method for this middlings stream.

Final extraction or froth clean-up can be accomplished by centrifugation. Froth from primary extraction can be diluted with a naphtha, and the diluted froth can be then subjected to a two-stage centrifugation. Such methods and variations are described in the prior art. These processes yield a product of essentially pure, but diluted, bitumen. Water and mineral and any unrecovered bitumen removed from the froth constitutes an additional tailing stream which must be disposed of. Methods for washing secondary-separator froths are disclosed in U.S. Pat. Nos. 3,784,464 and 3,738,930 both of which are discussed hereafter.

Tailings are a throwaway material generated in the course of extracting the valuable material from the non-valuable material and in tar sands processing consist of the whole tar sand plus net additions of process water less only the recovered bitumen product. Tar sand tailings can be subdivided into three categories: (1) screen oversize; (2) sand tailings—the fraction that settles rapidly, and (3) tailing sludge—the fraction that settles slowly. Screen oversize is typically collected and handled as a separate stream.

Tailings disposal in all the operations is required to place the tailings in a final resting place. Because the tailings contain bitumen emulsions, finely dispersed clay with poor settling characteristics and other contaminants, water pollution considerations prohibit discarding the tailings into rivers, lakes or other natural bodies. Currently, the tailings are stored in retention ponds (also referred to as evaporation ponds) which involve large space requirements and the construction of expensive enclosure dikes. A portion of the water in the tailings can be recycled back into the water extraction process as an economic measure to conserve water. Currently two main operating modes for tailings disposal are (1) dike building—hydraulic conveying of tailings followed by mechanical compaction of the sand tailings fraction; and (2) overboarding—hydraulic transport with no mechanical compaction.

At one commercial location, for dike building, tailings are conveyed hydraulically to the disposal area and discharged onto the top of a sand dike which is constructed to serve as an impoundment for a pool of liquid contained inside. On the dike, sand settles rapidly and a slurry of water, silt, clay and minor amount of bitumen, as well as any chemical used during processing flows into the pond interior. The settled sand is mechanically compacted to build the dike to a higher level. The slurry which drains into the pond interior commences stratification in settling over a time scale of months to years. As a result of this long term settling, two layers form. The top layer, e.g., about 5–10 feet of the pool, is a layer of relatively clear water containing minor amounts of solids, e.g., up to about 5 wt.% and any dissolved chemicals. This layer of pond water can be recycled to the water extraction process without interfering with extraction of bitumen from tar sands. Below this clear water layer is a discontinuity in solid contents. Over a few feet, solids content increases to about 10–15 wt.% and thereafter, solids contents increase regularly toward the pond bottom. In the deeper parts of the pond, solid contents of over about 50 wt.% have been measured. This second layer is commonly called the sludge layer. The solids contents of the sludge layer increase regularly from top to bottom by a factor of about 4–5. Portions of the solids are clays. The clays, dispersed during processing, apparently have partially reflocculated into a fragile gel network. Through this gel, particles of larger-than-clay sizes are slowly settling. Generally this sludge layer cannot be recycled to the separation step because no additional bitumen is extracted. A third layer formed of sand also exists.

Overboarding is the operation in which tailings are discharged over the top of the sand dike directly into the liquid pool. A rapid and slow settling process again occurs, but this distinction is not as sharp as in the previously described dike building and no mechanical compaction is carried out. The sand portion of the tailings settles rapidly to form a gently sloping beach, extending from the discharge point toward the pond interior. As the sand settles, a slurry drains into the pool and commences long-term settling.

In general pond water containing more than about 10–15 wt.% mineral matter can be referred to as sludge. Thus water in ponds prepared by both dike building and overboarding can be included in the general definition of sludge in the present description.

Methods for treating sludge formed in a retention pond used to store tailings from a hot water extraction of bitumen from tar sands are disclosed in Canadian Pat. Nos. 975,696; 975,697; 975,698; 975,699 and 975,700 all issued Oct. 7, 1975 to H. J. Davitt. The first mentioned Canadian Patent discloses removing sludge from a pond, placing the sludge in an air scavenger treating zone wherein the sludge is aerated and agitated concurrently to form an upper bitumen froth layer and a lower tailings of water and mineral water. The lower tailings can be discharged into a retention pond. The upper bitumen froth is sent to a settling zone wherein two layers are formed, an upper bitumen layer reduced in mineral matter and water and a lower layer comprised substantially of mineral matter and water with minor amounts of bitumen. The latter lower layer is recycled back to the air scavenger treating zone while the upper bitumen layer is processed further to recover the bitumen. This Canadian patent and the others also disclose that sodium silicate can improve bitumen recovery when used in connection with aeration and agitation. Canadian Pat. No. 975,697 discloses a process similar to that described in the previous patent with an additional step in that a portion of the lower layer, which otherwise would be recycled back to the air scavenger treating zone, is returned to the retention pond. Canadian Pat. No. 975,698 discloses feeding the sludge from a retention pond to an air pressure zone wherein the sludge is aerated at superatmospheric pressure to aerate bitumen in the sludge. Canadian Pat. No. 975,699 discloses feeding sludge recovered from a retention pond to a settling zone and permitting the sludge to form an upper froth layer and a lower tailings layer. Canadian Pat. No. 975,700 discloses feeding sludge to an air scavenger treating zone wherein the sludge is aerated and agitated concurrently and resulting froth is separated in the scavenger treating zone, while the tailings are returned to the pond. However, none of the previously discussed patents discloses or suggests applicants' improved method of treating froth obtained by agitation and aeration of pond sludge.

U.S. Pat. No. 3,594,306, E. W. Dobson, July 20, 1971, discloses upgrading froth from a secondary recovery operation (generally a flotation scavenger zone treating the bitumen-rich middlings from a separation zone) by allowing the froth to settle in a settling zone whereby an upper layer is formed which is substantially upgraded in bitumen content compared to the secondary froth. The lower layer formed in the settling zone can be recycled. Again, nothing in the aforementioned U.S. patent discloses or suggests applicants' improved method of treating froth obtained by treatment of pond sludge.

U.S. Pat. No. 3,738,930, V. P. Kaminsky, June 12, 1973, discloses forming a froth from a middlings stream from a primary cell. The formed froth is produced in a secondary cell and as it leaves the secondary cell it is treated to a fresh hot water wash which deaerates the secondary formed froth. The combination of the hot water wash and deaerated froth is subjected to intimate contacting in a froth washer cell and within a quiescent settling zone a more concentrated (as to bitumen) froth is formed. The temperature range of the hot water washer is 100°–200° F. U.S. Pat. No. 3,784,464, V. P. Kaminsky, June 8, 1974, discloses apparatus which can be used in the hot water washing of secondary froth.

U.S. Pat. No. 3,296,117, S. Ross, etal, Jan. 3, 1973, discloses upgrading froth from a primary recovery operation (wherein fresh tar sand and water are contacted) by water washing the froth. The washing involves contacting incoming froth countercurrently with incoming water. The water used contains an additive such as tetrasodium pyrophosphate and the temperature of the water washing zone is maintained in the range of 140° F. to 200° F. The water washed product, an emulsion, is separated from solids (contained in the froth) and contacted with a selective demulsifier mixture whereby a water-free oil phase and an oil-free water phase are obtained and separated. U.S. Pat. No. 3,331,765, G. R. Canevari, et al, July 18, 1967, discloses a similar process using a different demulsifier mixture. U.S. Pat. No. 3,330,757, J. A. Bichard, July 11, 1967, also discloses a similar process using a chelating agent with the water wash for the froth produced in the primary tar sand-water mixing step. However, nothing in the previously discussed U.S. patents discloses or suggests applicants' improved method for treating pond sludge, as distinguished, for example, from the middlings treated by Kaminsky. U.S. Pat. No. 4,018,664, F. A. Bain et al., Apr. 19, 1977, discloses a method for treating sludge from a retention pond associated with hot water extraction of bitumen from bitumen sands. The method involves withdrawing sludge from a pond, diluting and mixing it with water, and settling to obtain a froth layer, a middle layer containing less solids than the original sludge, and a lower layer containing increased solids over the original sludge. Agitation and/or aeration, for example, aeration sufficient to mildly agitate the sludge, are disclosed as beneficial and essential to the extent that proper mixing is achieved. Proper mixing presumably means that the sludge and dilution water are in such close association that samples taken anywhere in the mixture all would contain essentially the same amount of water. However, nothing in the aforementioned patent suggests applicants' method for treating froth obtained from sludge.

SUMMARY OF THE INVENTION

The present invention is an improved method for processing froth containing bitumen, mineral and water. The froth is obtained from the treatment of sludge obtained from a retention pond used to store tailings from water extraction of bitumen from tar sands. The improved method involves diluting the froth prepared from the treatment of pond sludge with water, agitating and aerating concurrently the resulting mixture and then separating an upper layer of resulting froth in which most of the bitumen is concentrated. The improved method can be also considered as demineralizing froth or as the beneficiation of the froth.

DESCRIPTION OF THE DRAWING

The attached drawing is a schematic representation of a hot water tar sands extraction process and how one embodiment of applicants' method relates to the extraction process. The following discussion describes generally the hot water tar sands extraction process and describes how applicants' improvement could be incorporated therein.

DETAILED DESCRIPTION

Referring now to the single FIGURE, tar sands are fed into the system through a line 1 and pass to a conditioning drum (or muller) 30. Water and stream are introduced to the drum 30 through another line 2. The total water so introduced in liquid and vapor form is a minor amount based on the weight of the tar sands processed. The tar sands conditioned with water, pass through a line 3 to a feed sump 31 which serves as a zone for diluting the pulp with additional water via line 20 before passage to the separation zone 32. The additional water 20 may be clear pond water.

The pulp tar sands are continuously flushed from the feed sump 31 through a line 4 into separator zone 32. The settling zone within the separtor 32 is relatively quiescent so that bitumen froth rises to the top and is withdrawn via line 5 while the bulk of the sand settles to the bottom as a tailings layer which is withdrawn through line 6. The froth withdrawn via line 5 is sent to froth settling zone 34 where it is processed along with froth from the flotation scavenger zone.

A middlings stream is withdrawn through line 7 to be processed as described below. Another middlings stream, which is relatively bitumen-rich compared to the stream withdrawn through line 7, is withdrawn from the separation zone 32 via line 8 to a flotation scavenger zone 33. In this zone, an air flotation operation is conducted to cause the formation of additional bitumen froth. The froth from zone 33 is sent via line 9 to froth settling zone 34.

Also a bitumen-lean water stream is removed from the bottom of the scavenger zone 33 through line 10 to be further processed as described below.

The combined froths from zones 32 and 33 can be sent to a froth settler zone 34. In the settler zone 34 some further bitumen-lean water is withdrawn from the froth and removed through line 11 to be mixed with the bitumen-lean water stream from the flotation scavenger zone 33, the sand tailings stream from the separation zone 32 and a portion of the lower middlings withdrawn via line 21 from the separation zone 32. The bitumen froth from the settler 34 is removed through line 12 for further treatment.

The bitumen-lean water from the froth settler zone 34, the scavenger zone 33 and the separator 32, all of which make up a tailing discharge stream, which can be collected and handled via a dike building or a overboarding operation both of which are previously described. The tailing discharge stream via line 13 can be fed to distribution pipe 14. The distribution piping provides for continuous and uniform delivery of the effluent 15 to the pond 35. The latter can be considered another separation zone; it is a zone of quietness. Both the dike building and overboarding operation result in what is commonly referred to as a pond, particularly a retention pond. And as previously described three layers are formed in the pond. They are (1) a top water layer relatively free of clay and bitumen and which can be recycled; (2) a middle layer consisting of bitumen and mineral (defined as not being soluble in toluene); and (3) a bottom layer having a relatively high concentration of sand. The middle layer of the pond is often referred to as sludge.

The sludge is continuously being formed in a time span of many months and even years. As a result, its charactistics are different from those of the middlings layer drawn off from the separation zone 32 via lines 7 and 8. Some of the differences include a higher pH (e.g., about 8.4) of the middlings layer whereas the sludge has a lower pH (e.g., about 7.3). The differences in pH reflect changes which are not fully understood but which are occurring in the pond. Another difference between the sludge and middlings streams (via lines 7 and 8) is the weight percent of mineral, e.g., the middlings stream contains about a 8-12 wt.% whereas the sludge contains a higher weight %, at least about 15 wt.%, e.g., about 15-65 wt.%.

Sludge is withdrawn from the pond 35 and treated by adding an effective amount of a bitumen release promoter, e.g., sodium silicate, to the sludge. Then the resulting mixture is concurrently agitated and aerated and as a result substantial quantities of bitumen are released from the sludge. In particular, sludge from the pond 35 is withdrawn by known means, for example, line 16 which is attached to suction pump 38. Line 17 from the latter carries the sludge to treating zone 36, wherein it is agitated and aerated to produce an upper froth layer of bitumen-rich material and a lower layer of bitumen-lean material. An effective amount of the additive is admixed with the incoming sludge 17 or added to treating zone 36. The additive can be added to the treating zone 36, e.g., via line 18. In any of the previously described methods the resulting bitumen-rich froth can be separated and forwarded to additional processing via line 19 while the remaining bitumen-lean material can be returned to the same pond or a different pond (not shown) via line 24.

In one embodiment of applicants' improvement the resulting froth, with or without additive, from treating zone 36 is sent to beneficiation zone 37 wherein the froth is mixed with additional water via line 25 and subjected to agitation and aeration concurrently. An upper layer of the resulting froth is separated which layer contains most of the bitumen. The separated froth containing the concentrated bitumen is removed and transferred via line 23 for further processing, while the bottoms layer containing much of the mineral is also transferred via line 22 for further suitable treatment.

In applicants' improved method of treating froth an effective amount of water is used to dilute the incoming froth to the beneficiation zone. An effective amount is that amount which causes an increase in the concentration of bitumen contained in the upper froth layer while at the same time decreasing the amount of mineral and water. The water can be pond water (clear upper layer) or fresh water or some other suitable water. Generally the water does not contain an adverse amount of bitumen and/or mineral or any other material which would interfere with the separation process, and does not contain a substantial amount of mineral matter. Generally, the amount of water used is within the range of 0.5 to 2 volumes of added water per volume of froth.

The resulting mixture of froth and effective amount of dilution water is also concurrently agitated and aerated vigorously. The amount and kind of agitation and aeration is sufficient to cause the froth containing a higher concentration of bitumen to form. The agitation and aeration is obtained by use of a turbine or other means known to those skilled in the art of mixing. The length of agitation and aeration can vary depending, in part, on the particular mixing means used, the relative amounts of material being processed compared to the size of the equipment and other variables known to those skilled in the art. Further, the amount of vigorous agitation and aeration used concurrently causes a turbulence of the mixture which exceeds mere mixing wherein the object it to obtain a uniform composition. Generally, the high-shear agitation used to practice the invention can be at a suitable Reynolds Number for a particular unit, however, preferably the Reynolds Number would be higher than 10,000, more preferably higher than 100,000.

Contrary to the expectation that one would have, based on the discussed prior art, applicants have found that in treating froth derived from sludge an elevated temperature (e.g., 80°–85° C.) is not desirable. In fact, as demonstrated in the Examples, applicants have found that the temperature of the water used to dilute the forth should be an ambient temperature, e.g., 20° C. As used herein ambient refers to a temperature range of about 0° C.–37° C.

In the beneficiation zone the upper layer of the resulting formed froth can be separated from the balance of froth by known techniques, e.g., skimming, either while the agitation and aeration is occurring or after both have stopped. Also the froth formed can be transferred to a foam settler, and the separation performed in the settler. In any of the foregoing descriptions the advantage of applicants' improved method is that the bitumen is concentrated in the froth while the mineral and water content are decreased. Thus further processing of applicants' froth is greatly enhanced since a high mineral content causes high operating costs. Also applicants' method has the advantage of decreasing the water concentration of the separated froth.

Essentially then, applicants' improved method for separating bitumen from tar sands by a water extraction process wherein froth containing bitumen, mineral and water is recovered and further treated to separate the bitumen from the froth, comprises (a) diluting the froth feed with an effective amount of water such that after concurrent agitation and aeration most of the bitumen is concentrated in an upper portion of resulting froth, and the water used is at ambient temperature; (b) vigorously agitating and aerating concurrently the resulting mixture of feed froth and dilution water; and (c) separating an upper layer of resulting product froth in which most of the bitumen is concentrated. Further, applicants' improvement resides in obtaining the feed froth from the processing of tailing pond sludge. Still further, applicants' improvement is characterized by relatively low concentration of bitumen in the feed froth and the upper resulting layer of product froth having a relatively high concentration of bitumen. And still further, applicants' improvement is characterized by use of clear pond water as the dilution water.

The following examples illustrate the invention. Comparative examples are also given.

EXAMPLES

A froth was prepared in the following manner. Sludge and air were pumped continuously into the bottom of a flotation cell similar to a Western Machinery flotation cell (also referred to as a Wemco Cell) except that the agitator was a shrouded turbine. The product overflowed into a shallow tank where the froth was removed and collected in a large container. At the end, after thorough mixing, the froth analyzed 21% bitumen and 21% mineral, the remainder being water.

The data shown in the accompanying Table were obtained using the following procedure. The previously prepared froth, containing 21 wt.% bitumen and 21 wt.% mineral or a ratio of 1/1, was charged to a vessel along with an equal amount of pond water (clear, top layer). The resulting mixture was agitated by the use of a standard bladed turbine (in a baffled vessel) turning at 2000 rpm for five minutes. "Standard" is a word recognized by a person skilled in the art of mixing and refers to the ratio of blades to baffles sizes. At 2000 rpm the turbine also aerates the mixture. The upper layer of the froth was skimmed off and analyzed for content of bitumen and other components. The dilution and high agitation and aeration of run 1 caused concentration of bitumen to occur. Compared to the charged froth which had a bitumen/mineral ratio of 1/1, the skimmed off froth had a bitumen/mineral ratio of about 8.6/1. The wt.% of bitumen recovered was 95% of the amount charged, indicating an efficient process.

Run 2 was conducted to determine if an elevated temperature causes density differences which further increase recovery. Run 2 was conducted in the same manner as Run 1 except that instead of being conducted at 20° C. was conducted at 85° C. The data in the Table indicates that increasing the temperature, even with dilution, causes the wt.% bitumen recovered to decrease significantly, i.e., from 95 wt.% to 36 wt.%.

Run 3 was conducted in the same fashion as Run 2 except that the mixing was gentle, using a spatula. Because of the gentle agitation and no aeration the wt.% bitumen recovered greatly decreased compared to Run 1.

Runs 4 and 5 were conducted to demonstrate the effect of the lack of dilution with water. Run 4 was performed at an elevated temperature using the turbine. As shown in the Table the skimmed froth resulted in substantially no separation as compared to 36 wt.% bitumen recovery from Run 2. Run 5 shows that gentle mixing, without dilution and at an elevated temperature, causes some concentration of bitumen compared to Run 3. Run 6 demonstrated that a low temperature, mild agitation treatment fails to cause any separation of bitumen.

Treatment of other froths having different compositions also gives the advantages of applicants' dilution method. Also, use of other dilution ratios gives similar beneficiation of the various froths.

TABLE

Dilution of Froth Enhances Bitumen Recovery

| Run | Charge | Treatment | Temp °C. | Wt. % Bitumen Recovered[a] | Analysis of Froth | | |
|---|---|---|---|---|---|---|---|
| | | | | | % Bitumen | % Mineral | % Water |
| — | Froth | None | — | n.a. | 21 | 21 | 58 |
| 1 | Froth diluted with water[b] | Turbine, 2000 rpm 5 minutes | 20 | 95 | 60 | 7 | 33 |
| 2 | Froth diluted with water[b] | Turbine, 2000 rpm 5 minutes | 85(185° F.) | 36 | 68 | 10 | 32 |
| 3 | Froth diluted with water[b] | Gently mixed with spatula | 85 | 12 | 40 | 10 | 50 |
| 4 | Froth | Turbine, 2000 rpm 5 minutes | 80 | No separation | | | |
| 5 | Froth | Gently mixed with spatula | 80 | 28 | 43 | 14 | 43 |
| 6 | Froth diluted with water[b] | Gently mixed with spatula | 20 | No separation | | | |

[a](Weight of bitumen in separated upper froth layer (product) divided by weight of bitumen in froth (feed) charged) × 100.
[b]Dilution is on a one to one basis.

We claim:

1. In the method of processing froth obtained by agitation and aeration of pond sludge recovered from a retention pond used to store tailings from water extraction of bitumen from tar sands, the improvement which comprises:
   (a) diluting the froth feed with an amount of ambient temperature water effective to increase the concentration of bitumen in the upper layer of the froth;
   (b) vigorously agitating and aerating concurrently the resulting mixture, wherein the agitation is a high-shear agitation providing a Reynolds Number of higher than 10,000, whereby most of the bitumen contained in the froth feed is concentrated in an upper layer of the resulting product; and
   (c) separating said upper layer of resulting froth product.

2. Improvement according to claim 1 wherein the water extraction process is a hot water extraction process.

3. Improvement according to claim 1 wherein the water is clear pond water.

4. Improvement according to claim 1 wherein the amount of water used to dilute the froth feed is in the range from 0.5 to 2 volumes of water per volume of froth feed.

* * * * *